UNITED STATES PATENT OFFICE 2,135,111

VANADYL LACTATE AND PROCESS OF MAKING IT

Harry J. Prebluda, Baltimore, Md.

No Drawing. Application April 27, 1936, Serial No. 76,695

5 Claims. (Cl. 260—429)

This invention relates to the production of soluble organic vanadium compounds. Particularly, the invention includes (1) a process of reaction, and (2) a reaction product thereof whereby a soluble, stable and substantially neutral organic salt of vanadium is formed having the general formula X—Y wherein X represents any cation containing as the metal only vanadium and Y represents any organic anion containing carbon, hydrogen and oxygen, and which is a disassociation product of an organic acid, and an insoluble inorganic salt is produced. An important feature of the invention is that I start with a soluble inorganic salt of vanadium in cation form and with vanadium in any of its valences and react the same with an organic salt whose cation will combine with the anion of the starting inorganic vanadium salt to form an inorganic insoluble salt and an organic salt most probably having the structural formula (here represented by vanadyl lactate) as follows:

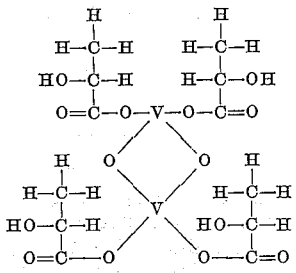

The vanadium organic salts of this invention are useful in the manufacture of antiseptics, e. g., in aqueous solution or solutions in organic solvents such as alcohol or glycerine, or polyhydroxy alcohols, using the salt in amount to give any required concentration. The salt in solid form or as a solution is useful also as a mouthwash or as a component of dentifrices. Particularly important, the salt may be administered orally in controlled and regulated doses, as well as by intramuscular, subcutaneous or intravenous injection. The salt also exhibits bactericidal, insecticidal and fungicidal effects.

The salt has shown anti-spirochaeticidal value and potency in a proper solvent such as water or organic solvents.

The salt is useful in its solid form, or in a solution, and may be incorporated in suitable bases or carriers to form a salve or in conventional soaps.

Solutions of the salt in proper concentration are useful as mordants for fixing dyes to textiles such as fabrics, metals, cellulose products such as paper, and chemically prepared materials such as resins. The salt is also useful in inks employing metal salts, e. g., iron gallates for stabilizing the solution.

The salt is incorporated in paints, using a proper solvent, e. g., alcohol, and is included in amount in the case of lead paints to counteract sulfide activity on exposure to air.

In the case of anti-knock motor fuels, the salt is dissolved in a proper organic solvent, such as polyhydroxy alcohols, organic esters, pyridine, diglycol-laurate, and the solution is then, in proper concentration and amount, usually a small quantity, incorporated in a fuel base such as gasoline. Of course, in the case of fuels, such as methanol, ethanol, and alcohols, particularly those of the lower carbon series, or where such fuel bases or other solvents are present in substantial amount in the fuel or in a fuel mixture, the salt is soluble. In each case, the anti-knock value of the fuel is substantially enhanced.

I have discovered that by proceeding with a reaction involving formation of an insoluble inorganic salt and a soluble organic vanadium salt having vanadium in cation form and in which the cation contains as the metal constituent only vanadium, the improved vanadium product is characterized by high purity, stability, definite and uniform composition and is economical for commercial production.

A preferred example of this discovery is expressed in the following equation for making vanadyl lactate:

The reaction takes place at normal temperature and pressure, but the reaction may be speeded by application of heat. A known concentration of barium lactate is added to a stoichiometric quantity of $V_2O_2(SO_4)_2$ in form of solid or standardized solution to produce a blue solution of vanadyl lactate and a white precipitate of barium sulphate. The latter compound is easily filtered and the filtrate is concentrated in vacuo or other suitable means to produce a blue solid. This compound vanadyl lactate on test discloses that it is substantially free from barium or sulphate ions. It is water soluble at room temperature and is soluble in organic solvents such as alcohols of the lower carbon series, e. g., ethyl alcohol, as well as polyhydroxy alcohols, pyridine and diglycol-laurate. It is also soluble in blood serum and lactic acid.

The reaction above expressed and the product are for purposes of illustration. That is to say, (1) as a starting material any organic salt whose cation will combine with the anion of the starting inorganic vanadium salt to form an inorganic insoluble salt may be used instead of barium lactate, and (2) as a starting inorganic vanadium salt, I use any salt whose anion will combine with the cation of the starting organic vanadium salt to form the inorganic insoluble salt, and a soluble organic salt of vanadium characterized by having the vanadium in cation form, and the cation containing as its sole metal constituent, vanadium.

For example, in the reaction above given, the lactate salts of the alkaline earth metals, such as strontium and calcium lactates, may be used, or salts of these metals with other organic compounds such as the gluconates, anisates, propionates and, in fact, any organic compound which, as stated, will produce (a) an inorganic insoluble salt and (b) a soluble organic salt of vanadium having the cation containing as the metal only vanadium.

Further, for example, in the above reaction instead of an vanadyl sulphate, sulphates of the other valences of vanadium may be used. Again, halogen derivatives of vanadium such as vanadium di, tri and tetrachlorides, and bromides, are used instead of the sulphate and, in such cases, an appropriate organic compound must be used whose cation is capable of combining with the anion of the vanadium compound to produce an inorganic insoluble salt, and the organic soluble vanadium compound whose cation contains as the metal only vanadium, e. g., vanadium tetrachloride (VCl₄) with silver lactate 4Ag(OOCCHOHCH₃) and represented by the following reaction:

$$VCl_4 + 4Ag(OOCCHOHCH_3) =$$
$$4AgCl + V(OOCCHOHCH_3)_4$$

As will be appreciated, I have discovered that the compounds used in the reaction may be widely varied so long as the organic and inorganic members combine to form an insoluble, inorganic compound and a soluble, organic vanadium compound with the vanadium in cation form and the cation containing as the metal constituent solely vanadium.

As a further form of my invention, I produce a water-soluble, organic vanadium compound with the vanadium in cation form by reacting organic acids such as lactic, gluconic, furoic with oxides of vanadium in each of its several valences, thereby forming the desired organic salt of vanadium whose cation contains as the metal constituent only vanadium.

For example, I form vanadyl lactate by the following reaction:

$$V_2O_4 + 4HOOCCHOHCH_3 =$$
$$4H_2O + (V_2O_2)(OOCCHOHCH_3)_4$$

The product of the present invention is a completely water-soluble organic compound or salt of vanadium in each of its several valences with the vanadium in cation form and the metal member of the cation consisting only of vanadium. This product is obtained as the reaction product of an inorganic vanadium salt and an organic salt, the cation of the latter combining with the anion of the vanadium compound to form an insoluble inorganic compound or salt and an organic water-soluble salt of vanadium with the vanadium in cation form as described. The vanadium compounds of this invention are stable in aqueous solution or in organic solvents. Moreover, the products are substantially neutral.

While I have referred herein to an organic salt of vanadium wherein the metal of the cation is solely vanadium, and the anion contains carbon, hydrogen, oxygen, it is to be understood that, in some cases, the anion will contain in addition sulphur and/or nitrogen. In such cases, I use as a starting inorganic vanadium salt any salt whose anion or non-metallic derivative, such as sulphur or nitrogen, will combine with the cation of the starting organic vanadium salt to form the inorganic insoluble salt, and a soluble organic salt of vanadium characterized by having the vanadium in cation form, and the cation containing as its sole metal constituent, vanadium.

The invention may be modified in various ways without departing from the essential features of the process and properties and characteristics of the product; such changes are considered to be within the scope of the appended claims.

I claim:
1. A vanadium salt of lactic acid.
2. A vanadium salt of lactic acid having the structural formula

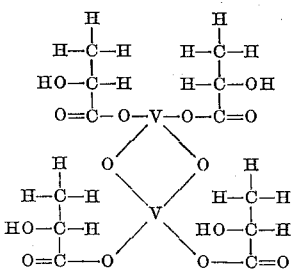

3. The process of making vanadium compounds comprising reacting in aqueous solution an inorganic salt of vanadium with an organic salt of vanadium to form an insoluble inorganic salt and a soluble salt of vanadium containing as the metal only vanadium.

4. The process of making vanadium compounds comprising reacting in aqueous solution an inorganic salt of vanadium with an organic salt of alkali earth metal to form an insoluble alkali earth metal salt and a soluble salt of vanadium containing as the metal only vanadium.

5. The process of forming vanadyl lactate which comprises reacting in aqueous solution an inorganic salt of vanadium with an alkali earth metal salt of lactic acid.

HARRY J. PREBLUDA.